July 12, 1960 R. H. MULLER 2,944,798
GUIDE PLATES FOR ROTARY REGENERATOR
Filed June 22, 1955

INVENTOR.
Robert H. Muller
BY
Wayne H. Lang
AGENT

United States Patent Office 2,944,798
Patented July 12, 1960

2,944,798
GUIDE PLATES FOR ROTARY REGENERATOR

Robert H. Muller, Wellsville, N.Y., assignor to The Air Preheater Corporation, New York, N.Y., a corporation of New York Filed June 22, 1955, Ser. No. 517,200

6 Claims. (Cl. 257—270)

The present invention relates to heat exchangers of the rotary regenerative type, and particularly it relates to an arrangement of auxiliary heat exchange and flow plates which greatly improve the operating efficiency of such heat exchangers.

In a rotary regenerative heat exchanger of the type herein referred to, a cylindrical rotor carrying compartments of regenerative heat transfer material is first exposed to a flow of hot gases directed through the rotor and is then subsequently positioned in the path of the stream of air or other fluid to be heated to impart heat from the gate thereto. The rotor is surrounded by a housing having end or sector plates formed with openings to permit gas and air to flow to and through the rotor compartments.

In an improved form of heat exchanger a maximum amount of heat exchange surface has been provided with a minimum pressure drop by arranging the matrix so that it comprises a plurality of concentric banks of axially disposed heat exchange sections, radially spaced to provide for the ingress and egress of fluids flowing therethrough. To direct fluid flowing through the banks of heat exchange element, imperforate baffles or flow plates are provided to extend diagonally from one end of an element bank to the opposite end of a radially spaced bank of similar element sections.

When the heat exchange element of a rotary regenerative heat exchanger is arranged in concentric banks there is a detrimental tendency for the high velocity gas and air to flow axially through the passageway between spaced heat exchange elements and "pile-up" at the far end of the rotor passageway causing uneven heating and inefficient use of heat exchange matrix. Moreover, opposite sides of the diagonal baffle members are subjected to opposite extremes in temperature since they are in direct contact with the hot and cold fluids traversing the heat exchanger. The diagonal baffle member is in a highly effective heat transfer zone because of the high temperature head between opposite sides thereof and it is therefore an object of this invention to reduce the temperature gradient across each diagonal baffle member so as to effect a decrease of heat transfer at a zone where it would materially decrease the overall efficiency of the heat exchanger.

Furthermore, in rotary regenerative heat exchangers of the type herein disclosed, a highly efficient matrix requires a high surface to mass ratio as is exemplified by its finely divided nature. Such an element is highly efficient from a heat transfer standpoint but it is also highly susceptible to fire in the event an extra hot blast of gas or incompletely burned fuel strikes the fine matrix at a critical time. It therefore becomes an important object of this invention to reduce if not entirely eliminate the possibility of fire within the heat exchange element of a rotary regenerative heat exchanger.

The invention will be best understood upon consideration of the following detailed description thereof when read in conjunction with the accompanying drawings in which.

Figure 1:
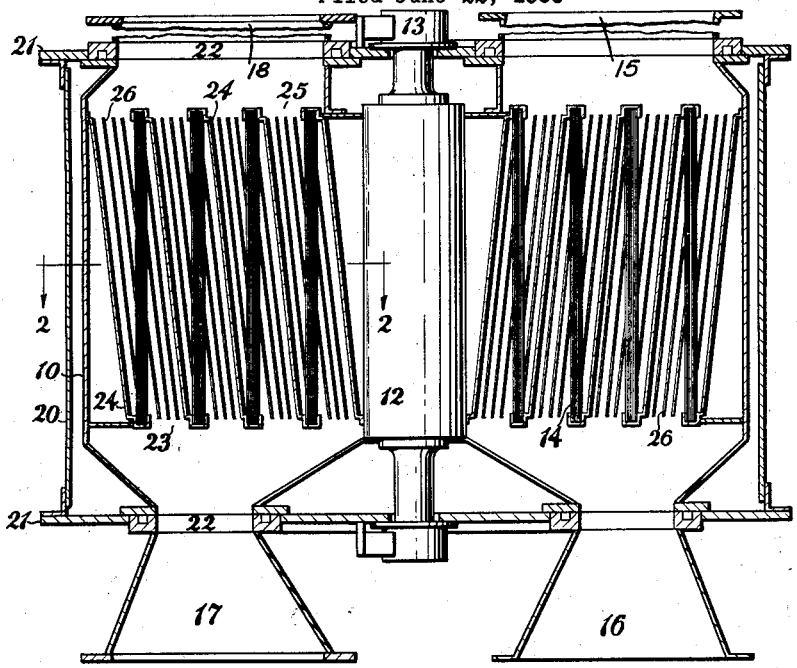
Figure 1 is a longitudinal section of a rotary regenerative heat exchanger arranged according to this invention.
Figure 2:
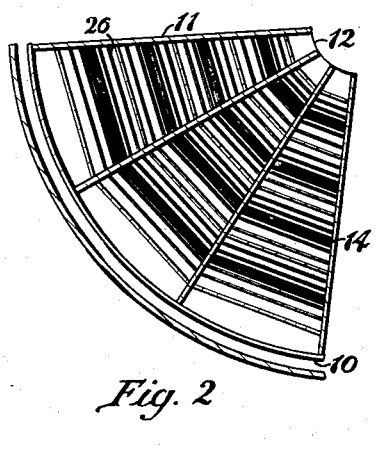
Figure 2 is a fragmentary sectional elevation of the device as seen from line 2—2 of Figure 1.
Figure 3:
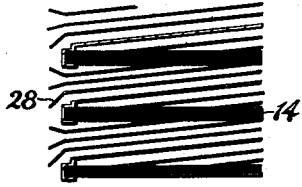
Figure 3 is a fragmentary sectional elevation of a slightly modified form of the invention.

In Figures 1 and 3 the numeral 10 designates the cylindrical shell of a rotor divided into sector shaped compartments by radial partitions or diaphragms 11 which connect it to a rotor post 12 which is driven by a motor and reduction gearing 13 to turn the rotor slowly about its axis. The rotor compartments contain regenerative heat transfer material 14 which first absorbs heat from hot gases entering the preheater through a duct 15 from a boiler or other source to be discharged after passing over heat transfer material through an outlet duct 16. As the rotor turns slowly about its axis, the heated material 14 is moved into the stream of air admitted through the duct 17. After passing over the heat exchange material and absorbing heat therefrom, the stream of heated air is conveyed to a boiler furnace or other place of use through duct 18.

A housing 20 enclosing the rotor 10 is provided at either end with end or sector plates 21 which are apertured at 22 and in alignment with ducts 15—18 to admit and discharge streams of gas or air flowing through the preheater.

The heat exchange material is mounted in sections 14 axially positioned and radially spaced between diaphragms 11 to provide axial passageways for the flow of fluid through the rotor. In order to direct fluid flow through the sections of heat exchange element, they are supported in concentric relation about the centrally positioned rotor post 12 by imperforate baffles 24 which extend between radial diaphragms and from one end of a heat exchanger section 14 to the axially opposite end of a radially spaced section.

When arranged in this maner each baffle member lying between radially spaced sections of heating element constitutes a passage wall common to a pair of oppositely tapering passageways as illustrated by passageways 23 and 25 of Figure 1. With this arrangement, cold air or hot gases flowing axially into the spaces between concentric masses of heat exchange element strike a diagonal baffle member and are turned in a general radial direction to flow through the perforate heat exchange mass 14. After traversing the perforate heat exchange mass the air or gas is again turned by a baffle member adjacent the opposite side of the heat exchange mass and forced to flow generally in an axial direction out of the heat exchanger into an outlet duct.

In accordance with this invention, a series of additional flow plates in the form of heat transfer elements 26 are arranged parallel to the diagonal baffle members so as to extend diagonally from axially spaced ends of the rotor to the radially spaced sections of heat exchange element 14. These sheets preferably are of various forms frequently used as heat exchange element in rotary regenerative heat exchangers. Specific forms most adaptable to use as flow plates include imperforate corrugated or undulated sheets having a relatively low surface to volume ratio. However, other forms including tab surface provide desirable properties and may be especially adapted to use under certain circumstances.

An arrangement of flow plates 26 disposed according to this invention would force an even distribution of fluid flow through the radially spaced heat exchange element sections thereby substantially improving the heat transfer efficiency of the heat exchanger. Since the intermediate flow plates would confine the fluid to relatively thin layers, the temperature change adjacent the diagonal flow plate 24 would be confined to the layer adjacent thereto which would in turn reduce the temperature head across the diagonal flow plate and decrease the heat transfer at this point. By supplying a large mass of material on the hot side of the heat exchange element, the tendency toward fire would be substantially reduced, since the temperature would be substantially modified by the heat exchange surface having a relatively low surface to mass ratio.

Although it is immaterial to this invention whether the auxiliary flow plates are installed as individual sheets or as prefabricated bundles, bundling by spot or tack welding the individual sheets together, offers certain advantages of assembly.

Further advantages of flow distribution may be achieved by the use of auxiliary flow plates that extend past the ends of the primary element as illustrated by elements 28 of Figure 3. By fanning out ends of the flow plates, fluid flow is smoothed out so the pressure drop of fluid passing through the rotor may be substantially reduced.

What I claim is:

1. A rotary regenerative heat exchanger or the like having a cylindrical rotor shell joined to a centrally positioned rotor post by radial partitions which form a series of sector shaped compartments; a housing surrounding the rotor and provided opposite the latter with end plates including imperforate portions between spaced apertures; inlet and outlet ducts connected to said apertured end plates to direct streams of hot gas and relatively cooler air to and through the rotor; regenerative heat transfer material carried by the rotor comprising a plurality of perforate element sections lying in banks parallel to the rotor axis and radially spaced to provide flow passageways extending between the axially spaced inlet and outlet ducts; imperforate flow sheets extending between opposite ends of radially spaced element sections dividing each passageway into a pair of oppositely tapering sections; and a plurality of intermediate flow sheets between adjacent banks of heat transfer material parallel to said imperforate flow sheets spaced to provide a plurality of passageways from the ends of the rotor to axially spaced portions of the element sections.

2. A rotary regenerative heat exchanger or the like as defined in claim 1 wherein the intermediate flow sheets are provided with extended surface to effect an increase in heat transfer efficiency thereof.

3. A rotary regenerative heat exchanger or the like as defined in claim 2 wherein the intermediate flow sheets extend axially of the banks of element sections and are axially divergent to guide fluid flowing through passageways therebetween and thereby prevent excessive drop in fluid pressure thereof.

4. A rotary regenerative heat exchanger or the like as defined in claim 1 wherein ends of the intermediate flow sheets diverge axially of the element section banks to direct fluid flow past ends of the perforate element sections.

5. A rotary regenerative heat exchanger or the like having a cylindrical rotor shell joined to a centrally positioned rotor post by radial partitions which form a series of sector shaped compartments; a housing surrounding the rotor and provided opposite the latter with end plates including imperforate portions between spaced apertures; inlet and outlet ducts connected to said apertured end plates to direct streams of hot gas and relatively cooler air to and through the rotor; a plurality of heat exchange element sections having a high surface to mass ratio lying in banks parallel to the rotor axis, said sections being radially spaced to provide flow passageways therebetween; imperforate flow sheets extending between opposite ends of radially spaced element sections to divide each passageway into a pair of oppositely tapering sections; and intermediate flow sheets parallel to said imperforate flow sheets spaced to provide a plurality of passageways between an end of the rotor and axially spaced portions of the element sections, said intermediate flow sheets having a relatively low surface to mass ratio providing a high resistance to fire.

6. A rotary regenerative heat exchanger as defined in claim 5 wherein the intermediate flow sheets are placed only in those sections of each flow passageway adjacent the inlet for the hot gas.

References Cited in the file of this patent

UNITED STATES PATENTS

| | | |
|---|---|---|
| 1,865,245 | Goodloe | June 28, 1932 |
| 2,287,777 | Boestad | June 30, 1942 |
| 2,680,008 | Karlsson | June 1, 1954 |